Figure 1:
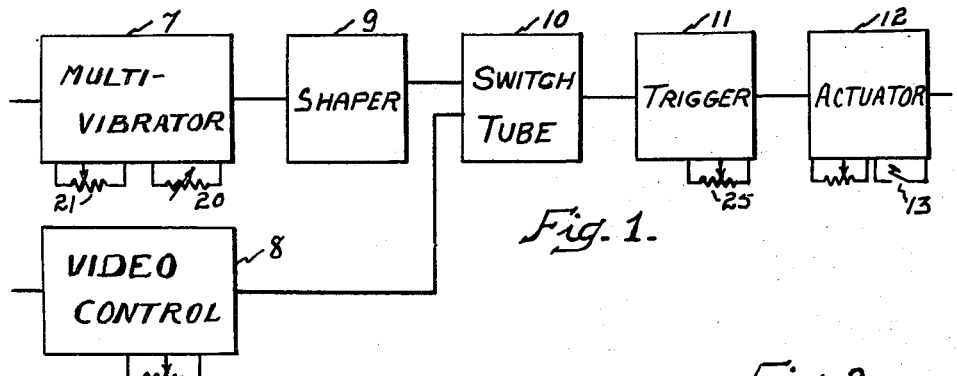

Sept. 5, 1950 R. R. MILLER 2,521,016
RADIO PULSE ECHO DEVICE WITH ALARM
ACTUATED BY SELECTED ECHOES
Filed Jan. 15, 1946

INVENTOR
Richard R. Miller

Patented Sept. 5, 1950

2,521,016

UNITED STATES PATENT OFFICE 2,521,016

RADIO PULSE ECHO DEVICE WITH ALARM ACTUATED BY SELECTED ECHOES

Richard R. Miller, Pittsfield, Mass.

Application January 15, 1946, Serial No. 641,385

1 Claim. (Cl. 343—7)

My invention relates to electronic alerting devices and is intended to be used in connection with pulse-echo systems.

It is well known that a radio frequency or a supersonic frequency transmitted through a suitable medium will produce an echo, which, when it is received, will indicate the presence of an object or surface which has reflected it, and that a number of applications employing this principle come under the general head of pulse-echo systems. It is further known that these pulse-echo systems comprise a transmitter, a receiver, and an indicator unit, and that said indicator unit gives a suitable indication of what echoes are received. It is known that one cycle of operation of a pulse-echo system is called a sweep, that said sweep is initiated by the received transmitter pulse and continues for the time representing the range of the instrument, and that immediately following the received transmitter pulse, the indicator shows echoes of varying amplitude to which a variety of names has been applied, such as "water returns," or "land returns," and that these returns or echoes are unsignificant from the observer's point of view because they are identified, ever-present, and therefore do not represent objects of interest to the observer who is watching for the echo of a new unidentified object or surface.

My invention will be described as an electronic alarm actuator to be used in connection with pulse-echo systems, providing means for blocking out the above-described ever-present and unsignificant echoes and means of responding to a new and significant echo for the actuation of any suitable alarm.

In one preferred embodiment of my invention, two signals are fed into a switch tube. One of said signals is a square wave of negative polarity and of adjustable duration, generated by a one shot multivibrator, said multivibrator triggered by the keying pulse of the transmitter of the pulse-echo system, and this negative square wave is of amplitude sufficient to hold said switch tube to cut-off for the duration of said square wave. The other of said signals are the video signals originating in the receiver of the pulse-echo system, and it is assumed that a sweep of video signals comprises the received transmitter pulse, identified and unsignificant echoes, random noise, and a new significant echo. The negative square wave holds the switch tube to cut-off for the duration of the received transmitter pulse and the unwanted unsignificant echoes, but with the termination of said square wave, the switch tube comes into conduction again to pass any subsequent echo signal within the sweep. The significant echo selected from the unsignificant in the described manner is finally applied to a thyratron which actuates the relay for the actuation of any suitable alarm.

Figure 3:
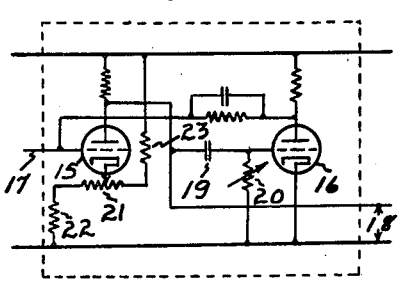
Figure 4:
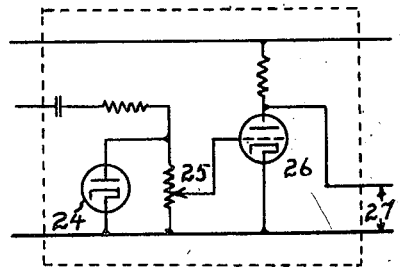
Figure 2:
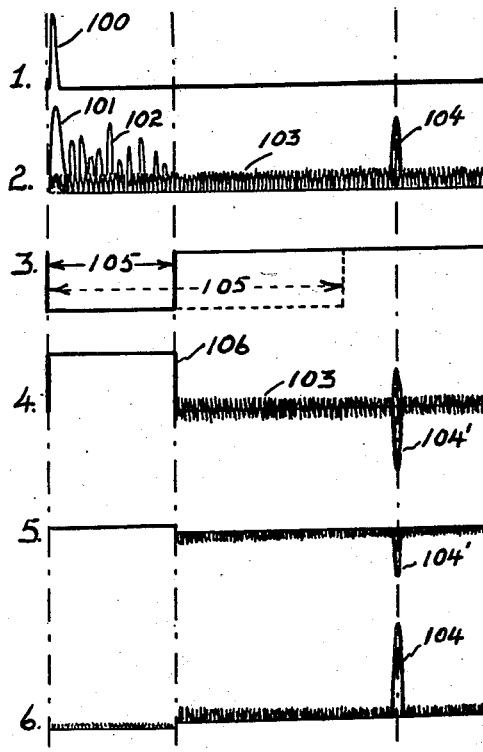

The invention will be better understood from the following description taken in connection with the accompanying drawing in which Fig. 1 is a block diagram of one embodiment of the invention; Fig. 2 is a graphical representation of the voltage variations within one sweep as they occur in the circuits shown in Fig. 1; Fig. 3 shows a suitable one shot multivibrator; and Fig. 4 shows a circuit providing means for suppressing the no longer useful square wave and for controlling the amplitude of signals applied to the thyratron.

In Fig. 1 the invention is shown applied to an alarm actuator for a pulse-echo system, and the invention comprises a one shot multivibrator 7 to generate a square wave of negative polarity, a wave shaper 9, together producing a square wave of variable duration, a video amplitude control circuit 3, a switch tube 10 for combining the output of 8 and 9, a trigger circuit 11 comprising a diode to suppress the square wave and an amplifier to improve the attenuated output of polarity opposite to that of said square wave, and an actuator 12 comprising a relay actuated by a thyratron for the actuation of any suitable alarm.

The one shot multivibrator schematically illustrated in Fig. 3 is triggered by the pulse 100, Fig. 2, originating in the keyer of the pulse-echo system. Said multivibrator generates a square wave of negative polarity and of duration 105 which is variable as is indicated by the dotted line. It will be apparent that the duration of the square wave may be adjusted to the needs or circumstances of observation. Fig. 3 illustrates a suitable one shot multivibrator consisting of two tubes 15 and 16. The grid of tube 15 is resistively coupled to the anode of tube 16 and the grid of tube 16 is capacitive-resistively coupled to the anode of tube 15. Resistance 20 is shown as variable. Tube 16 is unbiased. Suitable bias for tube 15 is achieved by means of the voltage divider comprising the resistors 22 and 23 and the potentiometer 21. The variable resistance 20 provides for adjusting the resistance capacitance time of the coupling elements 19 and 20 and determines the cut-off time of tube 16 and the duration of the negative square wave generated at the output 18 of the anode of tube 15. This output is applied to a suitable wave shaper 9, Fig. 1, the output of which is shown in 3, Fig. 2.

The video control circuit 9 comprises two stages of amplification designed to maintain an optimum signal to noise ratio of the video signals originating in the pulse-echo system, and control is achieved by means of a volume control potentiometer in the coupling between the said two stages. Said video signals originate in the receiver or the indicator unit of the pulse-echo system. A graph of one sweep of video is shown in 2, Fig. 2. The object of the video control circuit is to prevent random noise being applied to the switch tube of such amplitude as to bring said switch tube to saturation and thereby prevent differentiation between such random noise and the significant echo 104.

The switch tube 10 provides means of combining the output 2 of the video control circuit 8, in such manner as to block out all video signals received during the variable time 105, said switch tube being biased to produce the most favorable echo to noise ratio. A graphical representation of the output of the switch tube is shown in 4, in which 106 is the inverted square wave, 103 is random noise, and 104' the inverted significant echo.

The signal output of the switch tube is improved in the trigger circuit 11, in such a manner as to suppress the square wave 106 and control the amplitude of video signals occurring in that part of the sweep not blocked out by the square wave. Means for improving the output of the switch tube will be better understood by referring to Figure 4 of the drawing in which is shown the trigger circuit comprising a diode 24 and an amplifier 26. The large square wave 106 will be suppressed by the action of the diode 24 which will short out said square wave of positive polarity around the potentiometer 25, but will not pass current in presence of the echo pulse 104' of negative polarity, so that said pulse 104' will be applied to the grid of tube 26. Adjustment of the potentiometer 25 will provide for the most favorable echo to noise ratio in the output 6 of the amplifier tube 26. The output at 27 is applied to the grid of a thyratron in 12, Fig. 1.

The actuator circuit 12 comprises a thyratron and relay, said thyratron biased by means of a voltage divider in such a manner that random noise will not fire said thyratron but that the significant echo 104 will fire said thyratron, and provision is made for opening said circuit by means of an interrupter 13 placed in series with said relay and said thyratron to provide a means for extinguishing said thyratron and deactivating said relay.

Modifications in the design of my invention may become apparent in view of the foregoing disclosure. Accordingly the embodiments of the invention herein described and shown in the accompanying drawings are to be considered as illustrative only and the spirit and scope of the invention are to be limited solely by the appended claim.

What is claimed is:

In an electronic alarm-actuating alerting apparatus of a pulse-echo system having circuit means for admitting radio pulse echo signals received by said pulse-echo system, and a single one shot multivibrator for producing a square wave in the first portion of each cycle, means for adjusting the duration of said square wave, and a switch tube responsive to said square wave for blocking keying pulses and radio-echo pulses from nearby objects received by said pulse-echo system during said square wave; an automatic alarm circuit comprising a thyratron and relay means connected to the output of said switch tube, said thyratron being triggered by the first pulses occurring after the termination of said square wave for actuating an alarm device, said alarm device thereafter remaining permanently actuated until manually released.

RICHARD R. MILLER.

REFERENCES CITED

The following references are of record in the file of this patent:

UNITED STATES PATENTS

| Number | Name | Date |
|---|---|---|
| 2,373,145 | Sensiper et al. | Apr. 10, 1945 |
| 2,403,527 | Hershberger | July 9, 1946 |
| 2,406,316 | Blumlein et al. | Aug. 27, 1946 |
| 2,410,424 | Brown | Nov. 5, 1946 |
| 2,419,620 | Young | Apr. 29, 1947 |
| 2,421,018 | De Rosa | May 27, 1947 |
| 2,430,038 | Wertz | Nov. 4, 1947 |
| 2,433,838 | Elie et al. | Jan. 6, 1948 |